June 7, 1927.  
L. B. BARRETT  
1,631,510  
WIRE HOLDER  
Filed Dec. 4, 1925
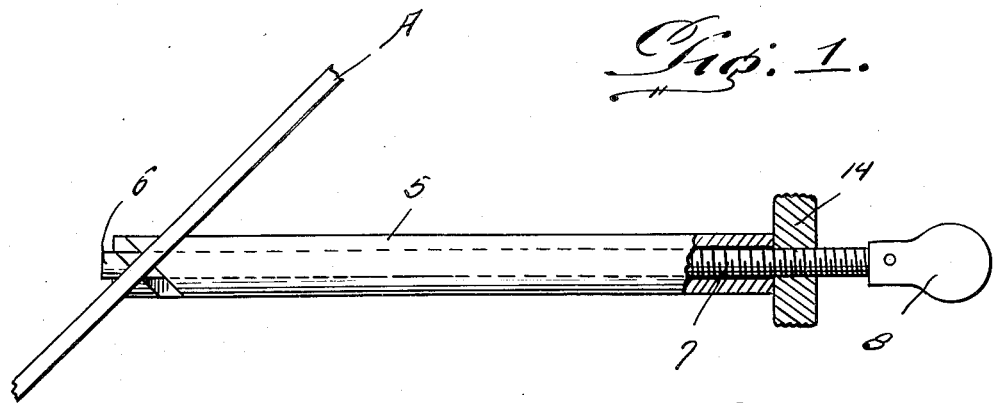
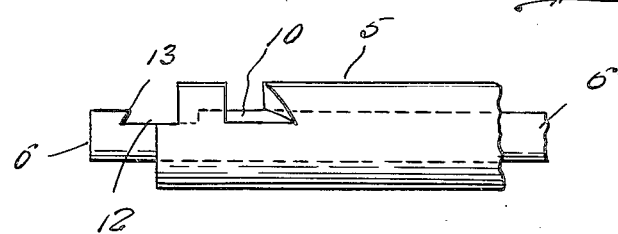
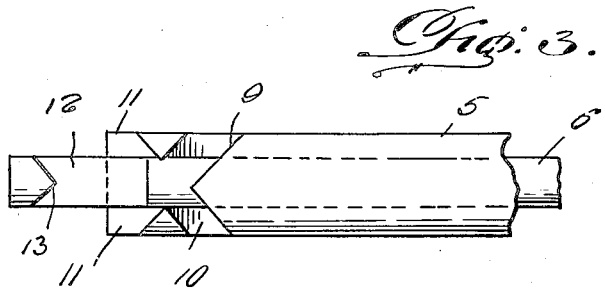
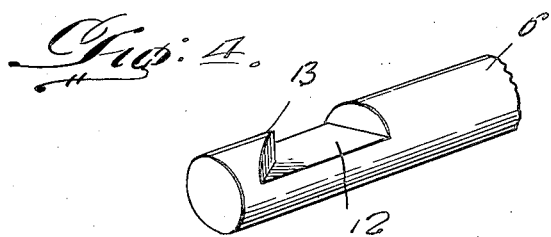
Inventor  
L. B. Barrett,  
By Clarence A. O'Brien  
Attorney Patented June 7, 1927.

1,631,510

UNITED STATES PATENT OFFICE.

LEWIS B. BARRETT, OF BANGOR, MAINE.

WIRE HOLDER.

Application filed December 4, 1925. Serial No. 73,191.

This invention relates generally to article holding implements and has more particular reference to a holder for length of wire to be soldered in order that the same may be properly manipulated and held at points inaccessible to the hands or fingers of the operator which is especially true in radio receiving and sending sets.

The primary object of the invention resides in the provision of a tool whereby a length of wire may be rigidly held while being soldered for preventing the burning of the fingers of the workman, and one that may be readily manipulated as to rigidly secure the wire section thereto without requiring any great skill.

A further and important object is to provide a tool of this character wherein the wire may be held at a plurality of angles with respect to the tool in order that the proper relation of the soldered wires with respect to each other may be provided.

A still further object is to provide a holder of this character that may be employed in the removing of insulation from coated wires for enabling their ends to be properly soldered.

With the foregoing and other objects in view as the nature of the invention will be better understood, the same comprises the novel form, combination and arrangement of parts hereinafter more fully described and shown in the accompanying drawings and claimed.

In the drawing wherein like reference characters indicate corresponding parts throughout the several views:

Figure 1 is a top plan view partly in cross section of a wire holder constructed in accordance with the present invention, Fig. 2 is an enlarged fragmentary side elevation of the tool, Fig. 3 is an enlarged fragmentary top plan view thereof, and Fig. 4 is an enlarged perspective of one end of the clamping rod of the present implement.

Now having particular reference to the drawing, my novel tool holder constitutes the provision of a relatively elongated metallic tube 5 preferably of small diameter of cross sectional area and through which a clamping rod 6 is adapted to freely move in opposite directions, said clamping rod 6 being of somewhat greater length than the tube 5 and being screw threaded at one end as at 7 and provided at this extreme end with a manipulating handle 8.

At the extreme forward end of the tube 5, the same is formed at its top surface with a pair of diagonally extending cross slots 9 and 10 that extend completely through the top surface of the tube and have communication with the interior thereof as more clearly shown in Figs. 2 and 3. Also as more clearly shown in Fig. 3, the material forming the tube 5 is cut away at the forward ends of the cross slots for providing shoulders 11—11 at this end of the tube upon opposite sides of the bore thereof.

Adjacent the forward end of the clamping rod 6 the same is provided upon its top side with a relatively elongated cut away portion for providing a plane surface 12, the material of the rod at the forward end of this plane surface being beveled at opposite sides for providing a knife edge 13 and also for providing surfaces that will cooperate with either cross slots 9 and 10 at their outer ends for completing these cross slots when the rod is moved to the position shown in Fig. 1.

For maintaining a length of wire A in diagonal relation in opposite directions with respect to the tool, said wire length is disposed within the proper slot 9 or 10 of the tube when said rod is drawn rearwardly therein to the position shown in Fig. 1. For maintaining the wire length rigidly with respect to the tool, there is provided a thumb nut 14 upon the threaded end of the rod which may be turned upwardly thereon until the same is tightly rested against the adjacent end of said tube also as clearly shown in Fig. 1.

When it is desired to maintain the wire length A at direct right angles with respect to the implement, said wire is disposed upon the shoulders 11—11 at the extreme forward end of the tube after which the rod is moved rearwardly and then the same will be maintained in this position by the action of the knife 13 binding the wire therebetween and material of the tube forming the forward ends of said diagonal slots.

Also by positioning an insulated wire in the last mentioned position of the tool, and then forcibly drawing the wire therefrom, the insulation will be efficiently scraped from the wire.

It will thus be seen that I have provided a highly novel, simple and efficient form of wire holder wherein a proper soldering of wire length may be provided without requiring the operator to hold the necessarily manipulated section in his hand which frequently causes burning injury to his person.

I have shown and described in this application one preferred embodiment of this invention, but I do not wish to be understood as being limited to the specific construction of the elements disclosed, insomuch as in the future practice of this invention, minor changes may be made therein without departing from the spirit and scope of the appended claims.

Having thus described my invention, what I claim as new and desire to secure by Letters Patent is:

1. In a wire holder of the class described, an elongated tubular member, a rod slidable in the bore of said member, said rod being of a length greater than the tubular member, being screw threaded at one end and provided on said screw-threaded end with a hand knob, a retaining nut carried by the screw threaded portion and adapted to abut one end of the tubular member, and cooperating wire engaging and clamping means on the opposite ends of the tubular member and rod, respectively, said means embodying a cut away portion at the extreme end of the tubular member, cooperating wire receiving grooves communicating with said cut away portion and disposed in divergent relation with respect to each other, and a cut out portion in the corresponding end of the rod, the outer wall of which is constructed to provide a tooth to bite into the wire.

2. In a wire holder of the class described, an elongated member having a central bore, a rod slidable in said bore, and cooperating wire engaging and clamping means on corresponding ends of the member and rod respectively, said means embodying a cut away portion at the extreme end of the tubular member, cooperating wire receiving grooves communicating with said cut away portion and disposed in divergent relation with respect to each other, and a cut out portion in the corresponding end of the rod, the outer wall of which is constructed to provide a tooth to bite into the wire.

In testimony whereof I affix my signature.

LEWIS B. BARRETT.